' Patent [19]
Fowler

[11] 3,890,389
[45] June 17, 1975

[54] PHOSPHATE SALTS OF AMINE BASED POLYOLS

[75] Inventor: Raymond H. Fowler, Chadds Ford, Pa.

[73] Assignee: ICI United States Inc., Wilmington, Del.

[22] Filed: Feb. 23, 1973

[21] Appl. No.: 335,369

[52] U.S. Cl.. 260/584 B; 260/2.5 AQ; 260/2.5 AR; 260/584 R
[51] Int. Cl. ............................................ C07c 91/02
[58] Field of Search ...................... 260/584 B, 584 R

[56] References Cited
UNITED STATES PATENTS

| 3,030,426 | 4/1962 | Moseley et al. | 260/584 B |
| 3,040,076 | 6/1962 | Seidel et al. | 260/584 B |
| 3,438,986 | 4/1969 | Kaiser et al. | 260/584 B |
| 3,578,607 | 5/1971 | Riggs et al. | 260/584 B |

FOREIGN PATENTS OR APPLICATIONS

| 1,130,512 | 11/1965 | United Kingdom | 260/584 B |

Primary Examiner—Elbert L. Roberts
Assistant Examiner—D. R. Phillips

[57] ABSTRACT

Disclosed is the phosphate salt of amine based polyols which are useful in preparing low density polyurethane foams. The phosphate salt of amine based polyols includes those compositions prepared by reacting alkoxylated mono- and/or polyamines with phosphoric acid. Rigid low density polyurethane foams are prepared from a polyol blend of a phosphate salt of an amine based polyol and one or more other polyhydroxy compounds.

7 Claims, No Drawings

PHOSPHATE SALTS OF AMINE BASED POLYOLS

This invention relates to the phosphate salt of amine based polyols and to low density cellular polyurethanes made therefrom.

Rigid polyurethane foams have found extensive use in modern industrial applications with respect both to the structural and to the insulative capacities thereof. Rigid low density polyurethane foams have in the past frequently exhibited disadvantageous characteristics of marked thermal instability, as evidenced by their tendency to shrink in volume at reduced temperatures or even at ordinary temperatures. Such shrinkage is usually attributable to the collapse, upon condensation to a liquid of the gaseous foaming agent, of relatively attenuated, and consequently weak, cell walls of the foam which result from the high ratio of such foaming agent to polyurethane materials employed in the foam formulation in order to produce a foam of low density.

It is an object of the present invention to provide novel phosphate salts of amine based polyols which can be used to prepare rigid low density polyurethane foams which are stable at low temperatures.

It is the further object of the present invention to provide rigid low density, thermally stable cellular polyurethanes.

It is another object of the present invention to provide rigid low density polyurethane compositions which exhibit excellent freezer stability while retaining the insulation value, and other desirable physical property characteristics of rigid polyurethane foams.

These and other objects are achieved in accordance with the present invention through the use of a phosphate salt of an amine based polyol as a polyol component in the preparation of polyurethane foams.

The phosphate salts of amine based polyols of the present invention are prepared by adding sufficient phosphoric acid to the amine based polyol so as to result in the formation of either a partially neutralized or completely neutralized amine based polyol.

The amine based polyols or polyoxyalkylene amines which are used as precursors in the preparation of the present phosphate salts of amine based polyols can be prepared from any of the well-known commercially available mono- and polyamines. In general, such amines containing from about 1 to 10 carbon atoms can be used in accordance with the present invention; however, in a preferred embodiment of this invention, such amines containing 2 to 6 carbon atoms are utilized. Among the polyamines that can be used are any of the known diamines, triamines, and tetramines. These amines, in turn, are reacted with an alkylene oxide to form polyoxyalkylene amines also known as polyethers.

The polyoxyalkylene amines which are used to make the amine based polyol phosphates of the present invention will generally have a hydroxyl number between about 350 and 800 and wwll contain from 3 to 30 mols of alkylene oxide per mol of amine. However, in a more preferred embodiment the polyol amines which are used to prepare the subject polyol amine phosphates will contain from about 3 to 20 mols of alkylene oxide per mol of amine. The alkylene oxide used can contain from 2 to 6 carbon atoms but is preferably propylene oxide or mixtures of ethylene oxide and propylene oxide.

In another preferred embodiment of the present invention the lower number of mols of alkylene oxide used to prepare the subject polyoxyalkylene amines should be that number which is sufficient to react with each amino hydrogen present in the amine and an upper limit of about 20 mols of alkylene oxide per mol of amine.

In more preferred embodiments of the present invention, the polyol amine phosphates of the present invention based on a diamine will contain from 4 to 8 mols of alkylene oxide per mol of diamine. Those amine polyol phosphates of the present invention based on monoamines will contain from 3 to 8 mols of alkylene oxide per mol of monoamine. Preferred amine polyol phosphates of the present invention based on triamines will contain from 5 to 9 mols of alkylene oxide per mol of amine, whereas the polyol phosphate amines of the present invention based on tetramines will contain from 6 to 10 mols of alkylene oxide per mol of tetramine.

In the above discussion of polyoxyalkylene amines and their corresponding phosphates, it is understood that when it is stated that a polyol amine or polyol amine phosphate contains a "certain number" of mols of alkylene oxide per mol of amine, it is meant that the amine is suitably reacted with said certain number of mols of alkylene oxide and thus the resulting polyether or polyoxyalkylene amine will actually contain groups or residues of the alkylene oxide used corresponding to the certain number of mols of alkylene oxide used to prepare the polyoxyalkylene amine.

In accordance with the present invention, the subject phosphate salts of aliphatic amine based polyols can be prepared by reacting polyoxyalkylene amines, as described above, with from about 0.25% to about 10% by weight of concentrated phosphoric acid (86%), based on the total weight of polyoxyalkylene amine-phosphoric acid reaction mixture, to form the phosphate salt thereof. In a more preferred embodiment from about 0.50 to about 5.00% by weight of concentrated phosphoric acid (86%), based on the total weight of polyoxyalkylene amine-phosphoric acid reaction mixture, is reacted with the above described polyoxyalkylene amines to prepare the subject phosphate salts of amine based polyols. It will be understood by those skilled in the present art that the desired concentration of phosphoric acid as indicated above can be obtained through the use of a different strength acid (other than 86%). The preparation of such phosphate salts is accomplished by mere mixing of the polyoxyalkylene amine and phosphoric acid so as to bring about a thorough and intimate contact between the two reactants for the purpose of reaction at temperatures from about room temperature (70°F.) up to about 150°F. for about 5 to 30 minutes.

Some of the preferred novel phosphate salts of aliphatic amine based polyols (polyethers) of the present invention can be represented by the following general formulas:

(a) 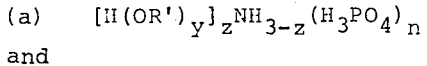

and (b) 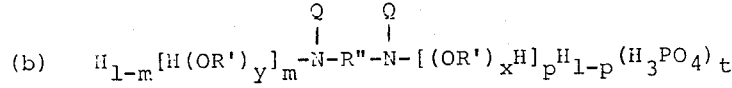

wherein R'' is selected from the group consisting of alkylene groups containing from 1 to 20 carbon atoms,

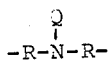

and

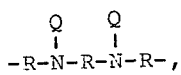

R is independently selected from the group consisting of alkylene groups containing from 1 to 6 carbon atoms, Q is independently selected from the group consisting of hydrogen and $-(OR')_nH$, R' is independently selected from the group consisting of alkylene groups containing from 2 to 6 carbon atoms, $y$ is a number of from 1 to 20, $x$ is a number of from 1 to 20, $z$ represents a number having an average value of 3 and $m$ and $p$ are independently selected values of 0 or 1 with the proviso that at least $m$ or $p$ is 1, $n$ has a value of from 0.03 to 0.5, $t$ has a value of 0.03 to 1.0 when the amine represented by formula (b) is a diamine, and a value of 0.05 to 1.5 and 0.05 to 2.0 when the amine represented by formula (b) is a triamine and tetramine, respectively. In a more preferred embodiment of the present invention, $n$ has a value of about 0.05 to 0.5, $t$ has a value of about 0.05 to 1 when the amine represented by formula (b) is a diamine, and $y$ and $x$ independently represent numbers from 1 to 15. In the above formula $n$ and $t$ represent the number of mols of $H_3PO_4$ that are reacted with 1 mol of polyoxyalkylene amine.

Polyurethane foams of the present invention are made from polyol compositions containing from about 5 to about 100%, more preferably 10 to 40% and most preferably 20 to 40% by weight, of the amine based polyol phosphates of the present invention as described above. The other portion of the polyol blend that can be used in the preparation of the subject low density foams can be made up of any of the suitable commercially available hydroxyl-bearing compounds having terminal hydroxyl groups which are thoroughly described throughout the prior art and hereinafter. In a preferred embodiment the polyol compositions of the present invention which can consist solely of the above-described amine based polyol phosphates or a blend of such phosphates with a second polyol or polyhydric alcohol, having a hydroxyl "functionality" of three or more, will have a hydroxyl number within the range of 350 to 650, preferably 400 to 500.

The polyoxyalkylene amines (nitrogen-containing polyethers) which are used as precursors in the preparation of the novel phosphate salts of amine based polyols (polyolamine phosphates) of the present invention are well known in the art, inasmuch as they have been extensively used as polyols in the preparation of polyurethanes, and they can be prepared by known processes. For example, such nitrogen-containing polyethers can be prepared from any of the commercially available aliphatic amines containing from 1 to 10 carbon atoms, such as monoethanolamine, triethanolamine, ethylenediamine, triethylenetetramine, diethylenetriamine, hexamethylenediamine, isopropylamine, 1,6-hexamethylenediamine, hexylamine, and butylamine, by reacting such amines with a 1:2-alkylene oxide. In most instances, the alkylene oxide used is ethylene oxide or propylene oxide or a combination thereof; however, such alkylene oxides containing up to six carbon atoms can be used. The method of preparing such nitrogen-containing polyethers as stated above is well known in the art, for example, as disclosed in U.S. Pat. No. 3,094,434 and in standard texts such as Saunders et al., "Polyurethanes: Chemistry and Technology," Part I and Part II, Interscience Publishers, New York, 1962 and 1964, respectively. Further, polyoxyalkylene amine precursors used to prepare the novel phosphate salts of amine based polyols are commercially available.

Among the polyoxyalkylene amines which are suitable for use in the preparation of the phosphate salt amine based polyols of the present invention are: polyoxyethylene(8) ethylenediamine; polyoxypropylene-(12)triethylenetetramine; polyoxypropylene(3)polyoxyethylene(1)ethylenediamine; polyoxyethylene(3)polyoxypropylene(2)diethylenetriamine; polyoxypropylene(2)ethanolamine; polyoxypropylene(3)diethanolamine; polyoxypropylene(8)triethanolamine; polyoxyethylene(6)-1,4-butanediamine; polyoxypropylene(5)-1,5-pentanediamine; polyoxypropylene (5)ethylenediamine; polyoxypropylene(2)-polyoxyethylene(2)ethylenediamine; and mixtures thereof.

The polyurethane compositions falling within the ambit of the present invention are broadly those cellular compositions comprising multiple urethane linkages formed by the reaction of an isocyanate and a compound containing a hydrogen atom or atoms reactive therewith, as, for example, hydroxyl-bearing compounds having terminal hydroxyl groups such as polyesters and polyethers. Polyhydric compounds which are blended with the novel phosphate salt amine based polyols of the present invention to prepare polyurethane foam compositions of the present invention comprise those having a hydroxyl functionality of three or more. In general, polyhydric compounds, i.e., polyethers and polyesters, having from three to nine hydroxyl groups in the molecule thereof are used to prepare the polyurethane foams of the present invention. These may be, for example, triols, tetrols, pentitols, hexitols, heptitols, octitols, nonitols, and mixtures thereof in any proportion. In accordance with this invention, however, such polyhydric compounds will generally have a hydroxyl number between about 350 and 650 inclusive.

The term "hydroxyl number" as used throughout this specification denotes the number of milligrams of potassium hydroxide equivalent to the acid required to esterify 1 gram of the hydroxylic material; the equivalent weight of the hydroxylic material, therefore, is the weight in grams thereof which contains one gram mol of the hydroxyl radical, i.e., 56,100 divided by hydroxyl number.

Polyether hydroxylic compounds which may be used in combination with the subject phosphate salts of aliphatic amine based polyols to prepare polyurethane foam compositions in accordance with this invention comprise polyoxyalkylene ethers of polyhydric alcohols, such as polyoxyalkylene triols, tetrols, pentitols, hexitols, and polyethers of still higher functionality. Such polyethers are exemplified by polyoxyalkylene trimethylolethane, polyoxyalkylene trimethylolpropane, polyoxyalkylene hexanetriol, polyoxyalkylene glycerol, polyoxyalkylene butanetriol, polyoxyalkylene erythritol, polyoxyalkylene pentaerythritol, polyoxyalkylene sorbitol, polyoxyalkylene methyl glucoside, polyoxyalkylene sucrose, polyoxyalkylene mannitol, polyoxyalkylene butanetetrol, polyoxyalkylene lactositol and the like. The polyoxyalkylene ether of the polyhydric alcohol may be prepared, if desired, by reacting an alkylene oxide compound with a selected polyhydric alcohol in the conventional manner.

More specifically, among the hydroxyl-bearing compounds which may suitably be used in combination with the novel phosphate salts of aliphatic amine based polyols to prepare polyurethane foams in accordance with this invention are: polyoxypropylene(10)sorbitol, polyoxypropylene(4)hexanetriol, polyoxybutylene(8)glycerol, polyoxypropylene(5)mannitol, polyoxypropylene(3)trimethylolethane, polyoxypropylene(8)trimethylolpropane, polyoxypropylene (4)sorbitol, polyoxybutylene(20)lactositol, polyoxyethylene(6-)methyl glucoside, polyoxypropylene(12)sorbitan, polyoxypropylene(8)erythritol, polyoxybutylene(4)pentaerythritol, polyoxyethylene(3)polyoxypropylene(7-)mannitan, polyoxyethylene (4)polyoxypropylene(10-)sucrose and mixtures thereof and many others. Generally, such polyethers will contain from 3 to 20 mols (residues) of alkylene oxide per mol of polyhydric alcohol.

Since the hydroxyl number of the polyol is a function of the number of hydroxyl groups per molecule thereof and the molecular weight of the compounds, it will be evident that the overall range of oxyalkylation in the polyol used in accordance with this invention is limited by the previously defined permissible range in hydroxyl number thereof.

Polyesters suitable for use in the preparation of polyurethane foams of this invention may be obtained by esterification condensation reaction of an aliphatic dibasic carboxylic acid with a triol or an alcohol of higher hydroxylic functionality, or mixtures thereof, in such proportion that the resultant polyesters possess predominately terminal hydroxyl groups.

Polyhydroxylic compounds suitable to the preparation of such polyesters are exemplified by glycerol, 1,2-hexanetritol, trimethylolethane, trimethylolpropane, sorbitol, methyl glucoside, lactositol, mannitol, and, in general, any similar polyhydric compound which when reacted in suitable proportion with a dibasic acid will provide a polyester with a hydroxylic functionality within the range of three to nine.

Aliphatic dicarboxylic acids which may be used to prepare such polyesters comprise adipic acid, fumaric acid, sebacic acid, phthalic acid, maleic acid, and many other acids of the kind.

Methods of preparation of polyesters suitable for use in the preparation of polyurethane foams are abundantly described in U.S. Pat. Nos. 2,543,644; 2,593,787; 2,409,633; 2,443,735; 2,443,741; 2,450,552; 2,255,313; 2,512,410; 2,634,251; 2,662,069; and 2,662,070 all hereby incorporated by reference.

A wide variety of organic isocyanate compounds may be used to prepare the novel polyurethane foam compositions of the present invention among which are included toluene diisocyanate (both the 2,4- and 2,6- isomers and any mixture thereof), biphenyl diisocyanate, terphenyl diisocyanate, chloro-phenylene-1,4-diisocyanate, 1,4-tetramethylene diisocyanate, p-phenylene diisocyanate, polymethylene polyphenyl isocyanate (PAPI), 3,3'-dimethoxy-4,4'-biphenylene diisocyanate, diphenylmethane, 4,4'-diisocyanate, and others.

Catalysts which may be used in the preparation of polyurethane foams of the present invention may include well-known amine catalysts which have been used to catalyze such reactions in the prior art. Among the suitable amine catalysts are dimethylethanolamine, N-methyldicyclohexylamine, and N,N-dimethylcyclohexylamine. These amine catalysts are generally used in amounts from about 0.05 to about 2% by weight of the hydroxyl-bearing compounds reacted with the isocyanate compound. In instances where the amine based polyol phosphate compounds of the present invention contain excess or unreacted phosphoric acid (not reacted with the amine based polyol reactant), additional quantities of amine catalyst may be used so as to neutralize the excess phosphoric acid and provide a catalytic concentration of the amine catalyst to catalyze the isocyanatepolyol reaction.

Examples of useful surface active agents which can be present in amounts of from about 0.05 to about 2% by weight of the hydroxyl-bearing components used to prepare the polyurethane foams are water-soluble siloxane-oxyalkylene block copolymers as described in U.S. Pat. No. 2,834,748 to Bailey et al., issued May 13, 1958. Other surfactants which may be used are condensates of ethylene oxide with a hydrophobic base formed by condensing propylene oxide with a propylene glycol. These surfactants have a molecular weight within the range of about 2000 to about 8000 and are generally ascribed the formula:

Illustrative examples of foaming agents which may be used in the preparation of polyurethane foams of the present invention include water, a halogenated saturated aliphatic hydrocarbon or a mixture of such halogenated saturated aliphatic hydrocarbons; for example, trichlorofluoromethane (Freon 11); monochloroethane; monochloromonofluoroethane; 1,2-dibromo-1,1,2,2-tetrafluoroethane; 1,1,2-trifluoroethane; 1,1,2,2-tetrafluoro-1,2-dichloroethane; 1,2-difluoro-1,1,2,2-tetrachloroethane; dichloromethane; dibromomethane, and their mixtures. A mixture of a halogenated saturated aliphatic hydrocarbon and water is a preferred foaming agent. In accordance with the method of this invention, not less than about 10% by weight nor more than about 25% by weight based on the total foam formulation of a suitable foaming agent, such as any of those set forth above or other similar foaming agents, is used to prepare the low density foam compositions included within the purview of this invention.

Within the context of this specification, the term "low density," when used with reference to the cellular polyurethane compositions of this invention, denotes foams having a density within the range of about 0.75 pound per cubic foot to about 1.7 pounds per cubic foot. Preferably, the foams of the present invention have a density lying within a range of about 1.2 pounds per cubic foot to about 1.5 pounds per cubic foot. Polyurethane foams having a density greater than 1.7 pounds per cubic foot are not deemed to be foams of low density within the meaning of that term as used herein.

The polyurethane foams provided in accordance with this invention are rigid foams as distinguished from flexible or semi-rigid foams. Throughout this specification the term "rigid," when used with references to the polyurethane foams of this invention, denotes foams having less than about 20% volume recovery when compressed by about 10% of the volume thereof. Rigid foams of this invention, moreover, comprise foams having not less than about 75% of the cells thereof in the form of closed cells. If more than about 25% of the cells of the said foams were open cells, the insulation values of the foams would be unsatisfactory.

The cellular polyurethane compositions of this invention may be prepared in the conventional manner thoroughly described in the prior art by mixing a polyhydroxylic blend, as hereinbefore described, with a polyisocyanate compound, as hereinbefore specified, in approximately stoichiometric proportion, based upon the hydroxyl number of the polyhydric component. In general, polyurethane foams of the present invention are prepared by reacting a hydroxyl-bearing component with an organic isocyanate in suitable proportion to provide a ratio of isocyanate groups to hydroxyl groups with a range of about 0.9 to about 1.25 with a preferred range for said ratio from about 1.0 to about 1.1. The polyol component and the isocyanate component are mixed vigorously to promote reaction and thereafter the reaction mixture is poured and allowed to foam to completion.

The following examples are illustrative of compositions which are useful as the polyol component for preparing the polyurethane compositions of this invention. These examples are set forth solely for the purposes of illustration and any specific enumeration of details contained therein should not be interpreted as expressing limitations of this invention. It will be readily apparent to those skilled in the art that other compositions may be prepared by substituting other polyols, polyisocyanates, catalysts, surfactants, and blowing agents for those recited in the following examples. All percentages are by weight.

EXAMPLE 1

172.4 Pounds of molten sorbitol containing less than 0.2% water were mixed with 480 grams of powdered sodium hydroxide and placed in an autoclave. The autoclave was sealed, flushed 3 times at 10 psig with nitrogen gas, heated to 165°C., and then a vacuum was drawn on the autoclave down to about 50 millimeters of mercury pressure. Propylene oxide (477.6 pounds) was added at 165°C./85 psig to the autoclave and the contents of the autoclave pumped through a heat exchanger to maintain the temperature and cause mixing of the mixture until the pressure was substantially zero. The mixture was then deodorized by vacuum stripping 15 minutes at 120°C. The resulting polyol was then diluted with an equal amount of distilled water and the diluted mixture was passed through a cation and anion exchange column and then vacuum stripped at 120°C. for 1 hour to yield the desired polyol containing less than 0.1% water. The resulting polyoxypropylene sorbitol product had a hydroxyl number of 420, viscosity of 18,600 centipoises at 25°C., and a water content of 0.09%.

EXAMPLE 2

Ethylenediamine (40 pounds) containing 0.25% water was placed in an autoclave and flushed three times with nitrogen gas and then heated to 120°C. by circulation through a heat exchanger. Then 60 pounds of propylene oxide were added at a rate to keep the temperature and pressure within the autoclave at about 135°C./25 psig. The mixture in the autoclave was agitated and 96.6 pounds more propylene oxide were added at a rate to keep temperature and pressure at about 135°C./25 psig. The reaction mixture in the autoclave was heated for about three hours at about 135°C., initially at a pressure of about 25 psig, until the pressure dropped to substantially zero. The reaction mixture was then cooled to 100°C. 74 Grams of powdered sodium hydroxide were added to the reaction mixture in the autoclave under a nitrogen gas flow, and then the autoclave was heated to 155°C./55 psig. Then a vacuum of about 50 millimeters of mercury was drawn and 130.3 pounds of propylene oxide were added at a rate to maintain temperature and pressure at about 155°C./55 psig, while the reaction mixture was circulated through a heat exchanger until a substantially zero pressure was obtained. The resulting polyoxypropylene ethylenediamine polyol was then deodorized by vacuum stripping 15 minutes at 120°C. under a vacuum of about 50 millimeters of mercury pressure. Then, to deash the polyol product, 1.6% sodium acid pyrophosphate and 5% distilled water were added to the resulting polyol. This blend was then agitated for two hours and then stripped at 110°C. at a final vacuum of about 50 millimeters of mercury pressure to a water content of less than 0.08%. Then 0.2% magnesium silicate and 0.4% Super Cel were added to the polyol. The resulting mixture was then filtered and the resulting polyoxypropylene ethylenediamine polyol product had a hydroxyl number of 464 and a water content of 0.06%.

EXAMPLE 3

36.9 Pounds of polyoxyethylene(4)-ethylenediamine were treated with 14 grams of powdered sodium hydroxide catalyst and 27.7 pounds of propylene oxide by the process of Examples 1 to yield a polyoxyethylene(4) polyoxypropylene-ethylenediamine polyol. This product was deashed by the following procedure. 39.2 Grams of 85% phosphoric acid and 54.5 grams of water were added to the above polyol product and heated at a temperature of 100°C. for 2 hours with agitation. The product was then vacuum stripped at 110°C. to yield a polyol containing 0.08% water. 54.5 Grams of magnesium silicate were then added to the polyol and the mixture was filtered to yield a polyoxyethylene polyoxypropylene ethylenediamine polyol having an acid number of 0.50, and a hydroxyl number of 443. The polyol product had a viscosity of 4,520 centipoises at 25°C.

EXAMPLE 4

80.8 Pounds of molten sorbitol and 240 grams of powdered sodium hydroxide were charged into an autoclave by the method of Example 2, and the mixture was treated with 185.6 pounds of propylene oxide initially followed by the addition of 58.6 pounds more of ethylene oxide. The polyol product obtained was also deashed by the method of Example 2. The resulting polyoxypropylene polyoxyethylene sorbitol polyol product had a hydroxyl number of 447, an acid number of 0.16 and a water content of 0.055%. The polyol product had a viscosity of 13,100 centipoises at 25°C.

EXAMPLE 5

By the method of Example 1, 80 pounds of molten sorbitol, 240 grams of powdered sodium hydroxide, and 245 pounds of propylene oxide were charged to an autoclave and reacted to form a polyoxypropylene sorbitol polyol. The polyol obtained was then deashed by the method of Example 2. The resulting product had a hydroxyl number of 440, water content of 0.07%, and an acid number of 0.15. The polyol product had a viscosity of 22,300 centipoises at 25°C.

EXAMPLE 6

4.8 Pounds monoethanolamine were charged into an autoclave and 11.2 pounds of sucrose were slowly added and mixed into the monoethanolamine. Then 109 grams of powdered sodium hydroxide were stirred into the above mixture and the autoclave was sealed and flushed three times at 10 psig with nitrogen. A nitrogen blanket was then applied at atmospheric pressure and the reaction was heated to 110°C. Then 54 pounds of propylene oxide were slowly added to the autoclave at a rate so as to maintain the temperature at about 110° to 115°C./40 to 50 psig. The reaction mixture was maintained at this temperature and stirred until the pressure was substantially zero for 30 minutes. The resulting product was then deodorized by vacuum stripping for 15 minutes at about 120°C. When the temperature of the product was about 105°C., 0.988% by weight of phosphoric acid (85%) was added to the reaction mixture which was then stirred for about 30 minutes. The resulting mixture was then vacuum stripped at about 110°C. under vacuum of about 50 millimeters of mercury until the water content was less than 0.05%. 0.1% Dalpac C-4 was then added to the resulting polyol product and thoroughly agitated therein and then the resulting product was filtered through paper to yield a polyol blend consisting of polyoxypropylene monoethanolamine and polyoxypropylene sucrose having a hydroxyl number of 408, water content of 0.18%, and acid number of 2.00. The polyol product had a viscosity of 4,030 centipoises at 25°C.

In the following Examples 8, 9, 11, 12, 14, and 15, polyurethane foams were prepared using novel phosphate salt amine based polyols of the present invention. Examples 7 and 10 are controls for Examples 8, 9, 11, and 12, and Example 13 is the control for Examples 14 and 15. The foams of Examples 7 to 15 were prepared using the following hand-mixing procedure.

Hand-Mixing Procedure

The polyols were weighed into a 12-ounce uncoated paper cup. Those polyols having phosphoric acid added thereto to prepare the novel phosphate salts of the amine based polyols were first heated to about 120°F. along with the added phosphoric acid under mechanical agitation for about 20 minutes in order to effect the preparation of the desired phosphate salts of the amine based polyols. Chemical analysis confirmed the formation of the said phosphate salts of the amine based polyols. The other B component ingredients were then added in the order listed from top to bottom, each being weighed into the cup until all the ingredients were added except the isocyanate. These were then mixed with a conventional laboratory electric stirrer at approximately 1,500 rpm until homogenous. The weight was then rechecked and any halogenated hydrocarbon blowing agent loss was made up by adding back the weight lost. This mixture constitutes what is referred to as B component in the listing of ingredients under each example. The isocyanate (referred to as the A component) is then added rapidly to the cup (B component) and the total foam ingredients were mixed for 10 seconds with the previously mentioned mixer. The resulting mixture is then poured rapidly into a mold. The mold utilized was a metal mold, 2 by 7 by 12 inches, inside dimensions. The foam was allowed to rise in the 12-inch direction. The "free blown foam panels" were made with the top of the mold open, and the "packed foam panels" were made with the top closed. The percent packing was calculated by using the formula:

$$\frac{[\text{Weight Packed Foam Panel Minus Weight Free Blown Foam Panel}] \times 100}{\text{Weight Free Blown Foam Panel}} = \text{Percent Packing}$$

The percent freezer shrinkage of the products of the following Examples 7 to 15 were determined by measuring the shrinkage of the molded polyurethane foam in the 7-inch direction after exposure of the foam to −20°F. temperature for 16 hours. For most commercial uses it is preferred that free blown foam panels should have a shrinkage less than 10% under the above-stated testing procedure; whereas packed foam panels should have a shrinkage below 3% under the same test conditions. However, free blown foam panels which exhibit a shrinkage less than 20% and packed foam panels exhibiting a shrinkage less than 15% under the above-stated testing procedure are also within the bounds of the present invention inasmuch as such products can be utilized in areas and uses when the thermal conditions are not quite so severe.

EXAMPLE 7

| Component A | Percent by Weight |
|---|---|
| Nacconate 5050 (commerical tolylene diisocyanate containing a mixture of 80% 2,4- and 20% 2,6- isomers). | 44.26 |
| Component B | Percent by Weight |
| Polyol of Example 1 | 25.00 |
| Polyol of Example 3 | 6.74 |
| (1)-ethylene oxide-(3)-propylene oxide ethylene diamine | 3.95 |
| Organo-silicone surfactant L-5340 (Union Carbide Co.). | 0.60 |
| N,N-dimethylcyclohexylamine | 0.70 |
| Water | 0.75 |
| Trichlorofluoromethane (Freon 11B) | 18.00 |
| Free Blown Panel | |
| Density | 1.23 lbs./cu.ft. |
| Freezer Shrinkage | 27.0% |
| Packed Panel | |
| Density | 1.38 lbs./cu.ft. |
| Packing | 12% |
| Freezer Shrinkage | 22.9% |

EXAMPLE 8

| Component A | Percent by Weight |
|---|---|
| Nacconate 5050 (commercial tolylene diisocyanate containing a mixture of 2,4- and 2,6- isomers). | 44.26 |
| Component B | Percent by weight |
| Polyol of Example 1 | 25.00 |
| Polyol of Example 3 | 1.74 |
| Polyol of Example 3 containing the addition of 1% phosphoric acid (86%) by weight, based on the total weight of acid and polyol. | 5.00 |
| (1)-ethylene oxide-(3)-propylene oxide ethylenediamine | 3.95 |
| Organo-silicone surfactant L-5340 | 0.60 |
| N,N-dimethylcyclohexylamine | 0.70 |
| Water | 0.75 |
| Trichlorofluoromethane (Freon 11B) | 18.00 |
| Free Blown Panel | |
| Density | 1.27 lbs./cu.ft. |
| Freezer Shrinkage | 17.4% |

EXAMPLE 8-Continued

|  | Packed Panel |
|---|---|
| Density | 1.41 lbs./cu.ft. |
| Packing | 10% |
| Freezer Shrinkage | 11.7% |

EXAMPLE 9

| Component A | Percent by Weight |
|---|---|
| Nacconate 5050 (commercial tolylene diisocyanate containing a mixture of 2,4- and 2,6- isomers). | 44.26 |

| Component B | Percent by Weight |
|---|---|
| Polyol of Example 1 | 25.00 |
| Polyol of Example 3 | 1.74 |
| Polyol of Example 3 containing the addition of 2% phosphoric acid (86%) by weight, based on the total weight of acid and polyol. | 5.00 |
| (1)-ethylene oxide-(3)-propylene oxide ethylenediamine | 3.95 |
| Organo-silicone surfactant L-5340 | 0.60 |
| N,N-dimethylcyclohexylamine | 0.70 |
| Water | 0.75 |
| Trichlorofluoromethane (Freon 11B) | 18.00 |

|  | Free Blown Panel |
|---|---|
| Density | −1.30 pounds/cubic foot |
| Freezer Shrinkage | −10.1% |

|  | Packed Panel |
|---|---|
| Density | −1.41 pounds/cubic foot |
| Packing | −8% |
| Freezer Shrinkage | −2.15% |

EXAMPLE 10

| Component A | Percent by Weight |
|---|---|
| Nacconate 5050 (commercial tolylene diisocyanate containing a mixture of 2,4- and 2,6- isomers). | 44.26 |

| Component B | Percent by Weight |
|---|---|
| Polyol of Example 1 | 18.40 |
| Polyol of Example 3 | 10.70 |
| Polyoxypropylene(8)sorbitol | 6.59 |
| Organo-silicone surfactant L-5340 (Union Carbide Co.). | 0.60 |
| N,N-dimethylcyclohexylamine | 0.70 |
| Water | 0.75 |
| Trichlorofluoromethane (Freon 11B) | 8.00 |

|  | Free Blown Panel |
|---|---|
| Density | 1.23 lbs./cu.ft. |
| Freezer Shrinkage | 38.2% |

|  | Packed Panel |
|---|---|
| Density | 1.38 lbs./cu.ft. |
| Packing | 12% |
| Freezer Shrinkage | 24.3% |

EXAMPLE 11

| Component A | Percent by Weight |
|---|---|
| Nacconate 5050 (commercial tolylene diisocyanate containing a mixture of 2,4- and 2,6- isomers). | 44.26 |

| Component B | Percent by Weight |
|---|---|
| Polyol of Example 1 | 18.4 |
| Polyol of Example 3 containing the addition of 1% phosphoric acid (86%) by weight, based on the total weight of acid and polyol. | 5.00 |
| Polyol of Example 3 | 5.70 |
| Polyoxypropylene(8)sorbitol | 6.59 |
| Organo-silicone surfactant L-5340 (Union Carbide Co.) | 0.60 |
| N,N-dimethylcyclohexylamine | 0.70 |
| Water | 0.75 |
| Trichlorofluoromethane (Freon 11B) | 18.00 |

|  | Free Blown Panel |
|---|---|
| Density | −1.28 pounds/cubic foot |
| Freezer Shrinkage | −11.6% |

|  | Packed Panel |
|---|---|
| Density | −1.34 pounds/cubic foot |
| Packing | −5% |
| Freezer Shrinkage | −5.8% |

EXAMPLE 12

| Component A | Percent by Weight |
|---|---|
| Nacconate 5050 (commercial tolylene diisocyanate containing a mixture of 2,4- and 2,6- isomers). | 44.26 |

| Component B | Percent by Weight |
|---|---|
| Polyol of Example 1 | 18.40 |
| Polyol of Example 3 | 5.70 |
| Polyol of Example 3 containing the addition of 2% phosphoric acid (86%) by weight, based on the total weight of acid and polyol. | 5.00 |
| Polyoxypropylene(8)sorbitol | 6.54 |
| Organo-silicone surfactant L-5340 | 0.60 |
| N,N-dimethylcyclohexylamine | 0.70 |
| Water | 0.75 |
| Trichlorofluoromethane (Freon 11B) | 18.00 |

|  | Free Blown Panel |
|---|---|
| Density | −1.31 pounds/cubic foot |
| Freezer Shrinkage | −1.45% |

|  | Packed Panel |
|---|---|
| Density | −1.38 pounds/cubic foot |
| Packing | −6% |
| Freezer Shrinkage | −1.43% |

EXAMPLE 13

| Component A | Percent by Weight |
|---|---|
| Nacconate 5050 (commercial tolylene diisocyanate containing a mixture of 2,4- and 2,6- isomers). | 42.61 |
| Polyol of Example 6 | 38.14 |
| Organo-silicone surfactant L-5420 | 0.60 |
| N,N-dimethylcyclohexylamine | 1.00 |
| Water | 0.75 |
| Trichlorofluoromethane (Freon 11B) | 17.00 |

|  | Free Blown Panel |
|---|---|
| Density | 1.35 lbs./cu.ft. |
| Freezer Shrinkage | 19% |

|  | Packed Panel |
|---|---|
| Density | 1.46 lbs./cu.ft. |
| Packing | 8.5% |
| Freezer Shrinkage | 6.5% |

EXAMPLE 14

| Coomponent A | Percent by Weight |
|---|---|
| Nacconate 5050 (commercial tolylene diisocyanate containing a mixture of 2,4- and 2,6- isomers). | 42.52 |

| Component B | Percent by Weight |
|---|---|
| Polyol of Example 6 | 38.03 |
| Phosphoric Acid (86%) | 0.20 |
| Organo-silicone surfactant L-5420 | 0.60 |

EXAMPLE 14-Continued

| | |
|---|---|
| N,N-dimethylcyclohexylamine | 1.00 |
| Water | 0.75 |
| Trichlorofluoromethane (Freon 11B) | 17.00 |
| Free Blown Panel | |
| Density | 1.37 lbs./cu.ft. |
| Freezer Shrinkage | 10.1% |
| Packed Panel | |
| Density | 1.51 lbs./cu.ft. |
| Packing | 10% |
| Freezer Shrinkage | 0% |

EXAMPLE 15

| Component A | Percent by Weight |
|---|---|
| Nacconate 5050 (commercial tolylene diisocyanate containing a mixture of 2,4- and 2,6- isomers). | 42.475 |
| Component B | Percent by Weight |
| Polyol of Example 6 | 37.975 |
| Phosphoric Acid (86%) | 0.30 |
| Organo-silicone surfactant L-5420 | 0.60 |
| N,N-dimethylcyclohexylamine | 1.00 |
| Water | 0.75 |
| Trichlorofluoromethane (Freon 11B) | 17.00 |
| Free Blown Panel | |
| Density | 1.36 lbs./cu.ft. |
| Freezer Shrinkage | 1.45% |
| Packed Panel | |
| Density | 1.485 lbs./cu.ft. |
| Packing | 9% |
| Freezer Shrinkage | 0% |

The following Examples 16 to 21 represent foams which were made by machine runs by the following process. The polyols were blended in a 5-gallon container and the phosphoric acid, silicone surfactant, catalyst, and water were added to the polyol blend with stirring. The resulting blend was thoroughly mixed for about ten minutes at a temperature of about 72°F. Chemical analysis of the resulting blend of polyols, phosphoric acid, surfactant, catalyst, and water confirm the formation of the desired phosphate salts of the polyoxyalkylene amine based polyols utilized. Then the halogenated hydrocarbon blowing agent was incorporated in the polyol blend. The above polyol blend is described hereinafter as the B component. Then the B component and A component (which is the polyisocyanate) were loaded into two tanks on an Admiral Urethane Foam Machine (manufactured by Admiral Equipment Corporation, Akron, Ohio). The temperature of each component was adjusted to 70°F. and the correct ratio of A and B components was obtained by weighing a sample shot of material from the head or discharge opening in the foam machine without the mixer in place. Then the mixer was placed on the machine and foam was made at 26.8 pounds per minute at mixer speed of 6,000 rpm. The foam was poured into a 2 × 18 × 24 inch mold to free rise density. The top of the foam was then cut off level with the mold and the foam content of the mold weighed to determine the free rise density. For packed foams, approximately 10% more of the mixture of the A and B components were added to the mold than normally used; and a tight cover was placed over the mold. Then the foam was allowed to rise to fill the confined volume of the mold to give a 10%-packed foam.

The percent freezer shrinkage of the products of the following Examples 16 to 21 were determined by measuring the shrinkage of the molded polyurethane foam in the 18-inch direction after exposure of the foam to −20°F. temperatures for 16 hours. In Examples 16 to 21 the percent of shrinkage considered acceptable within the bounds of the present invention for free blown foam panels and packed foam panels under the immediately above-described testing procedure is the same as that stated above in relation to the free blown foam panels and packed foam panels of Examples 7 to 15.

EXAMPLE 16

| Component A | Parts by Weight |
|---|---|
| Nacconate 5050 (commercial tolylene diisocyanate containing a mixture of 2,4- and 2,6- isomers). | 44.26 |
| Component B | Parts by Weight |
| Polyol of Example 1 | 18.40 |
| Polyol of Example 3 | 10.60 |
| Phosphoric Acid (86%) | 0.10 |
| Polyoxypropylene(8)-sorbitol | 6.59 |
| Organo-silicone surfactant L-5340 (Union Carbide Co.). | 0.60 |
| N,N-dimethylcyclohexylamine | 0.70 |
| Water | 0.75 |
| Trichlorofluoromethane (Freon 11B) | 17.00 |
| Free Blown Panel | |
| Density | 1.22 lbs./cu.ft. |
| Freezer Shrinkage | 12.5% |
| Packed Panel | |
| Density | 1.33 lbs./cu.ft. |
| Freezer Shrinkage | 5.4% |

EXAMPLE 17

| Component A | Parts by Weight |
|---|---|
| Nacconate 5050 (commercial tolylene diisocyanate containing a mixture of 2,4- and 2,6- isomers). | 45.73 |
| Component B | Parts by Weight |
| Polyol of Example 1 | 19.20 |
| Polyol of Example 3 | 11.02 |
| Polyol of Example 6 | 6.85 |
| Phosphoric Acid (86%) | 0.15 |
| Organo-silicone surfactant L-5340 | 0.60 |
| N,N-dimethylcyclohexylamine | 0.70 |
| Water | 0.75 |
| Trichlorofluoromethane (Freon 11B) | 15.00 |
| Free Blown Panel | |
| Density | 1.35 lbs./cu.ft. |
| Freezer Shrinkage | 10.1% |
| Packed Panel | |
| Density | 1.5 lbs./cu.ft. |
| Freezer Shrinkage | 4.8% |

EXAMPLE 18

| Component A | Parts by Weight |
|---|---|
| Nacconate 5050 (commercial tolylene diisocyanate containing a mixture of 2,4- and 2,6- isomers). | 45.24 |
| Component B | Parts by Weight |
| Polyol of Example 1 | 18.94 |
| Polyol of Example 3 | 10.75 |
| Polyol of Example 6 | 6.77 |
| Phosphoric Acid (86%) | 0.25 |
| Organo-silicone surfactant L-5340 | 0.60 |
| N,N-dimethylcyclohexylamine | 0.70 |
| Water | 0.75 |
| Trichlorofluoromethane (Freon 11B) | 16.00 |
| Free Blown Panel | |
| Density | 1.3 pounds/cubic foot |
| Freezer Shrinkage | 15.5% |
| Packed Panel | |
| Density | 1.45 pounds/cubic foot |
| Freezer Shrinkage | 4.75% |

EXAMPLE 19

| Component A | Parts by Weight |
|---|---|
| Hylene TIC (commercial tolylene diisocyanate containing a mixture of 2,4- and 2,6- isomers). | 45.24 |
| Component B | Parts by Weight |
| Polyol of Example 1 | 18.95 |
| Polyol of Example 3 | 10.75 |
| Polyol of Example 6 | 6.77 |
| Phosphoric Acid (86%) | 0.25 |
| Organo-silicone surfactant L-5340 | 0.60 |
| N,N-dimethylcyclohexylamine | 0.70 |
| Water | 0.75 |
| Trichlorofluoromethane (Freon 11B) | 16.00 |
| *Free Blown Panel* | |
| Density | 1.36 pounds/cubic foot |
| Freezer Shrinkage | 9.0% |
| *Packed Panel* | |
| Density | 1.45 pounds/cubic foot |
| Freezer Shrinkage | 5.6% |

EXAMPLE 20

| Component A | Parts by Weight |
|---|---|
| Nacconate 5050 (commercial tolylene diisocyanate containing a mixture of 2,4- and 2,6- isomers). | 44.82 |
| Component B | Parts by Weight |
| Polyol of Example 5 | 26.31 |
| Polyol of Example 2 | 11.27 |
| Phosphoric Acid (86%) | 0.25 |
| Organo-silicone surfactant L-5340 | 0.60 |
| N,N-dimethylcyclohexylamine | 1.00 |
| Water | 0.75 |
| Trichlorofluoromethane (Freon 11B) | 15.00 |
| *Free Blown Panel* | |
| Density | 1.32 pounds/cubic foot |
| Freezer Shrinkage | 4.5% |

EXAMPLE 21

| Component A | Parts by Weight |
|---|---|
| Nacconate 5050 (commercial tolylene diisocyanate containing a mixture of 2,4- and 2,6- isomers). | 45.01 |
| Component B | Parts by Weight |
| Polyol of Example 4 | 26.45 |
| Polyol of Example 2 | 11.34 |
| Phosphoric Acid (86%) | 0.25 |
| Organo-silicone surfactant L-5340 | 0.60 |
| N,N-dimethylcyclohexylamine | 0.60 |
| Water | 0.75 |
| Trichlorofluoromethane (Freon 11B) | 15.00 |
| *Free Blown Panel* | |
| Density | 1.48 pounds/cubic foot |
| Freezer Shrinkage | 9.6% |
| *Packed Panel* | |
| Density | 1.59 pounds/cubic foot |
| Freezer Shrinkage | 3.9% |

Having described the invention, what is desired to be secured by Letters Patent is:

1. A polyol composition represented by the formulas:

(a) 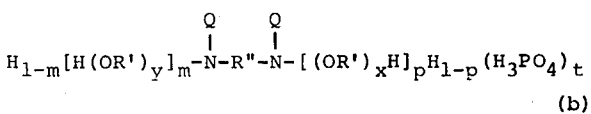 $[H(OR')_y]_z NH_{3-z}(H_3PO_4)_n$ and $$H_{1-m}[H(OR')_y]_m-N-R''-N-[(OR')_xH]_p H_{1-p}(H_3PO_4)_t$$

(b)

wherein R'' is selected from the group consisting of alkylene groups containing from 1 to 20 carbon atoms,

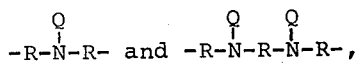

$$-R-N-R- \text{ and } -R-N-R-N-R-,$$

R is independently selected from the group consisting of alkylene groups containing from 1 to 6 carbon atoms, Q is independently selected from the group consisting of hydrogen and $-(OR')_yH$, R' is independently selected from the group consisting of alkylene groups containing from 2 to 6 carbon atoms, $y$ is a number of from 1 to 20, $x$ is a number of from 1 to 20, $z$ represents a number having an average value of 3 and $m$ and $p$ are independently selected values of 0 or 1 with the proviso that at least $m$ or $p$ is 1, $n$ has a value of from 0.03 to 0.5, $t$ has a value of 0.03 to 1.0 when the amine represented by formula (b) is a diamine and a value of 0.05 to 1.5 and 0.05 to 2.0 when the amine represented by formula (b) is a triamine and tetramine, respectively.

2. A polyol composition of claim 1 comprised of a phosphate salt of polyoxyalkylene ethylenediamine containing an average of 4 to 20 oxyalkylene groups per mol of ethylenediamine.

3. A polyol composition of claim 1 comprised of a phosphate salt of polyoxyethylene ethylenediamine containing an average of 4 to 8 ethylene oxide groups per mol of ethylenediamine.

4. A polyol composition of claim 1 comprised of a phosphate salt of polyoxypropylene ethylenediamine containing an average of from 4 to 8 propylene oxide groups per mol of ethylenediamine.

5. A polyol composition of claim 1 comprised of a phosphate salt of polyoxypropylene monoethanolamine containing an average of 3 to 8 propylene oxide groups per mol of monoethanolamine.

6. A polyol composition of claim 1 comprised of a phosphate salt of polyoxypropylene diethylenetriamine containing an average of from 5 to 9 propylene oxide groups per mol of diethylenetriamine.

7. A polyol composition of claim 1 comprised of a phosphate salt of polyoxypropylene triethanolamine containing an average of 3 to 8 propylene oxide groups per mol of triethanolamine.

* * * * *

UNITED STATES PATENT OFFICE
CERTIFICATE OF CORRECTION

PATENT NO. : 3,890,389
DATED : June 17, 1975
INVENTOR(S) : Raymond H. Fowler

It is certified that error appears in the above-identified patent and that said Letters Patent are hereby corrected as shown below:

Column 1, line 59 reads: "wwll" should read: --will--.
Column 2, line 30 reads: "certain number" should read: --"certain number"--.
Column 2, line 34 reads: "certain number" should read: --"certain number"--.
Column 2, line 44, reads: "0.50" should read: --0.50%--.
Column 4, line 33 reads: "functionality" should read: --"functionality"--.
Column 8, line 32 reads: "Examples" should read: --Example--.
Column 10, line 17 reads: "free blown foam panels" should read: --"free blown foam panels"--.
Column 10, line 19 reads: "packed foam panels" should read: --"packed foam panels"--.
Column 10, line 21 reads: "free blown foam panels" should read: --"free blown foam panels"--.
Column 10, line 22 reads: "packed foam panels" should read: --"packed foam panels"--.
Column 12, Example 13, after the line "2,4- and 2,6- isomer)." please insert the line:
   --Component B        Percent by Weight--
Column 12, Example 14, line 61 reads: "Coomponent A" should read: --Component A--.
Column 14, lines 3 and 4 reads: "free blown foam panels and packed foam panels" should read: --"free blown foam panels" and "packed foam panels"--.
Column 14, lines 6 and 7 reads: "free blown foam panels and packed foam panels" should read: --"free blown foam panels" and "packed foam panels"--.
Column 14, before Example 16, please insert the paragraph --In the following Examples 16 to 21, all parts are by weight.--.

UNITED STATES PATENT OFFICE
CERTIFICATE OF CORRECTION

PATENT NO. : 3,890,389
DATED : June 17, 1975
INVENTOR(S) : Raymond H. Fowler

It is certified that error appears in the above-identified patent and that said Letters Patent are hereby corrected as shown below:

Column 16, Claim 1, line 7 reads:

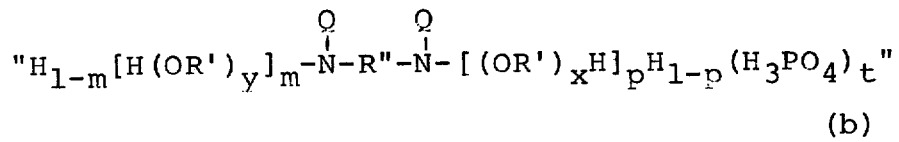
(b)

should read:
--(b)

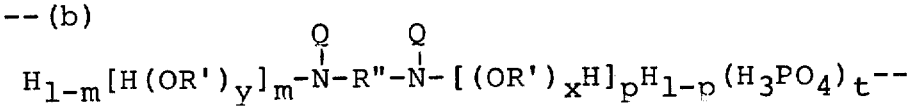
--

Signed and Sealed this twenty-eight Day of October 1975

[SEAL]

Attest:

RUTH C. MASON
Attesting Officer

C. MARSHALL DANN
Commissioner of Patents and Trademarks